United States Patent [19]

Hundeby

[11] 4,346,909
[45] Aug. 31, 1982

[54] TRANSPORT MECHANISM FOR SINGLE AND MULTIPLE UNIT PULL TYPE IMPLEMENTS

[75] Inventor: David R. Hundeby, Elbow, Canada

[73] Assignee: Macdon Industries, Winnipeg, Canada

[21] Appl. No.: 85,018

[22] Filed: Oct. 15, 1979

[30] Foreign Application Priority Data

Oct. 27, 1978 [CA] Canada .................................. 314551

[51] Int. Cl.³ ........................ B60D 1/14; A01B 73/00; A01D 55/00
[52] U.S. Cl. .................................. 280/411 C; 56/228; 172/314; 172/248; 280/412; 280/442; 280/463; 280/476 A
[58] Field of Search ........... 280/411 A, 411 B, 411 C, 280/411 R, 412, 413, 462, 463, 638, 656, 442, 476 A; 56/218, 228; 172/311, 314, 248, 625, 383

[56] References Cited

U.S. PATENT DOCUMENTS

| | | | |
|---|---|---|---|
| 1,632,013 | 6/1927 | Trauger | 280/442 |
| 2,226,556 | 12/1940 | Even et al. | 280/480 |
| 2,950,927 | 8/1960 | Hendrickson | 280/656 |
| 2,976,058 | 3/1961 | Sandgren | 280/476 A |
| 2,982,363 | 5/1961 | Sweet et al. | 280/444 |
| 3,469,636 | 9/1969 | Kurz | 280/411 C |
| 3,525,537 | 8/1970 | Honnold | 280/411 A |
| 3,675,945 | 7/1972 | Fischer | 280/411 C |
| 3,738,682 | 6/1973 | Ritter | 280/412 |
| 3,751,071 | 8/1973 | Patterson et al. | 280/478 A |
| 4,154,451 | 5/1979 | Young | 172/311 |
| 4,179,870 | 12/1979 | Rowse | 56/218 |
| 4,213,628 | 7/1980 | Hardesty | 280/476 A |

Primary Examiner—Joseph F. Peters, Jr.
Assistant Examiner—Donn McGiehan
Attorney, Agent, or Firm—Stanley G. Ade

[57] ABSTRACT

In its simplest form, a single unit implement such as a swather or the like, can be moved from field position to transport position by moving the rear offside wheels to the desired angle and fixing them in this position and allowing the near side rear wheel to castor freely. When used with multiple units, a tandem hitch is secured to the existing hitch of the front implement and extends to the next following implement with the rear wheel being positioned as heretofore. Adjustment may be provided between the adjacent units to set the relationship of the trailing unit relative to the leading unit.

17 Claims, 13 Drawing Figures

TRANSPORT MECHANISM FOR SINGLE AND MULTIPLE UNIT PULL TYPE IMPLEMENTS

BACKGROUND OF THE INVENTION

This invention relates to new and useful improvements in means to move pull type implements from a field working position to a transport position and vice versa.

Certain implements such as swathers, combines or the like are relatively wide and cannot therefore be pulled along highways or through the average gateway. They are not particularly well adapted for lengthwise transport movement without considerable modification and it is usual to mount them upon a longitudinally extending wheel mounted frame so that they can be pulled lengthwise. However, this requires separate equipment which is only used for this specific purpose.

In prior art devices known to applicant, U.S. Pat. No. 4,162,085 shows a swingable transport bar for moving side by side implements to an in line astern position and U.S. Pat. No. 2,850,863 shows a hitch pole freely pivotable to the implement which is similar to U.S. Pat. No. 3,457,709 which teaches a hitch pole moving from one position to the other.

U.S. Pat. Nos. 3,893,283 and 3,738,682 both show hitch poles which may be moved hydraulically from one position to another. U.S. Pat. No. 2,976,058 includes a draft hitch connecting two farm implements together and U.S. Pat. No. 3,683,605 shows a releasable cutter platform for a self-propelled combine which can be shifted from a transverse front position to an in line rear position.

Finally, Canadian Pat. No. 747,621 illustrates a transportable harvester in which the draft tongue can be re-positioned to extend leftwardly from and beyond the left hand end of the frame and in which the right hand end of the frame can be raised so that the wheels can be re-positioned.

These all suffer from various disadvantages such as involved mechanical construction, difficulty in transferring from one position to another and difficulty in adapting same to present implements to mention a few of said disadvantages.

SUMMARY OF THE INVENTION

The present invention overcomes these disadvantages by a relatively simple method and one aspect of the invention consists of a pull type implement such as a swather, combine and the like, means to transfer said implement from field working position to transport positions and vice versa, said means comprising a rear offside wheel assembly mounted for selective castoring action from a straight ahead position when in field working position to either of the two transport positions at an angle to the fore and aft axis of the implement, when in the transport positions and means to detachably lock said wheel assembly in any of the said positions.

A further embodiment of the invention contemplates connecting a plurality of such implements together in echelon relationship under which circumstances, the invention includes a connector frame assembly for mounting at least two such implements in echelon one behind and to one side of the other, each implement including a forwardly extending hitch pole assembly, said frame including a forwardly extending frame hitch pole assembly detachably secured to the hitch pole assembly of said other implement, and rear transverse component extending to one side of the rear end of said frame hitch pole assembly, said hitch pole assembly of said one implement being secured by the front end thereof to the distal end of said rear transverse component. This enables the implements to be moved to either semi or full transport position giving the narrowest effective wheel width with a fixed hitch pole and frame in one embodiment or with a movable hitch pole and frame in another embodiment.

Another advantage of the invention is to provide a device of the character herewithin described which can either be supplied as an "add on" component, or alternatively, it can be built with the equipment at the factory.

With the foregoing in view, and other advantages as will become apparent to those skilled in the art to which this invention relates as this specification proceeds, the invention is herein described by reference to the accompanying drawings forming a part thereof, which includes a description of the preferred typical embodiment of the principles of the present invention, in which:

DESCRIPTION OF THE DRAWINGS

In the drawings like characters of reference indicate corresponding parts in the different figures.

DETAILED DESCRIPTION

Although this invention relates to a pull type swather of the windrower type, nevertheless it will be appreciated that it can be used with other implements.

As is well known, pull type swathers and the like are relatively wide machines when in the field working position because the elongated platform is disposed with its length transverse to the line of advance and such machines may often attain widths of from 12 feet to 40 feet or more. This makes it virtually impossible to transport the machine without arranging for it to be drawn endwise or a provision of a trailer for transporting the machine.

Figure 1:
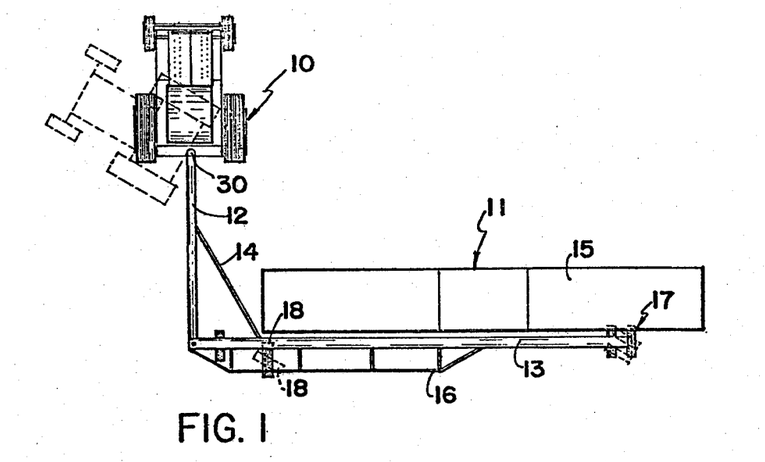
FIG. 1 is a schematic plan view showing the invention in its simplest form as applied to a single implement.

Proceeding therefore to describe the invention in detail, reference should first be made to FIG. 1 in which reference character 10 illustrates the wheels of a tractor (not illustrated) with a swather shown schematically by reference character 11 being connected behind the tractor by means of the hitch pole assembly 12. The swather includes the hitch pole assembly 12 with the swather frame 13 extending substantially at right angles from the rear end thereof and a diagonal brace 14 extending between adjacent the front of the hitch pole 12 and the frame as clearly shown. The table assembly 15 is mounted upon the swather frame forwardly thereof and in the present drawing, is shown to be a central delivery type although other types can of course be used. Bracing structure 16 extends rearwardly of the frame and is conventional and the swather is supported by a pair of dual wheels 17 situated adjacent the offside end of the frame 13 and a single wheel 18 mounted upon the frame 13 adjacent the inner end thereof. The wheels 17 are referred to as a rear offside wheel assembly and the wheel 18 as a rear near side wheel assembly. The wheel assembly 18 is preferably mounted for castoring action in the conventional manner to the frame 13 but it is in the fixed position shown in full line when in the field working position.

However, when it is desired to transport the swather as will hereinafter be described, it is necessary that this wheel be allowed to freely castor (as shown in phantom) and means are provided to fix the wheel in the straight ahead or field working position as will hereinafter be described.

The wheel assembly 17 which is preferably but not essentially a dual wheel assembly is also mounted to the frame 13 for castoring action, said castoring action being of course conventional so that it is not believed necessary to describe same insofar as structure is concerned. However, means are provided in the present invention to allow the wheel assembly 17 to be moved from a straight ahead position shown in full line in FIG. 1 at which position it is locked, to an angled position as shown in phantom in FIG. 1 under which circumstances it is also locked for semi-transport position.

Figure 1A:
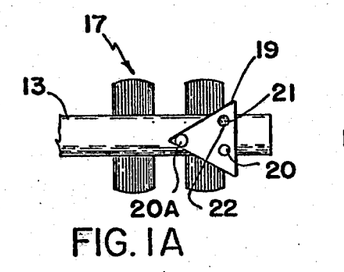
FIG. 1A is a fragmentary schematic plan view showing the rear offside wheels in the field working position.
Figure 1B:
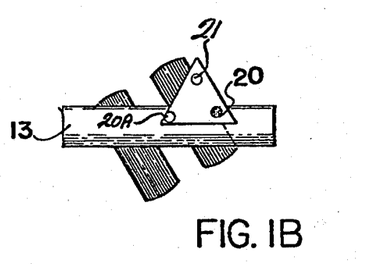
FIG. 1B is a view similar to FIG. 1A but showing the offside wheels in the transport position.

FIGS. 1A and 1B show one method of locking this castoring wheel assembly in either of two positions. A plate 19 is secured to the spindle 20A upon which the wheels castor and this plate is provided with apertures 20 and 21. A pin 22 engages through either one of these apertures and through a corresponding aperture (not illustrated) formed within the frame 13. When in the position shown in FIG. 1A, the pin engages through aperture 21 on the plate 19 and when the wheels are turned to the semi-transport position shown in FIG. 1B, the pin is engaged through the aperture 20.

A similar plate can be provided for the wheel assembly 18, it being only necessary to supply one aperture 21 through which a pin may engage to lock the wheel assembly in the straight ahead position. When this pin is removed, of course, the wheel assembly 18 becomes a freely castoring wheel assembly.

In operation, the wheel assemblies 18 and 17 are locked in the straight ahead or fore and aft position when the swather is in the field working position and the tractor is also in the straight ahead position all as indicated in full line in FIG. 1.

However, when it is desired to transport the swather in the semi-transport position, the tractor is moved in the direction illustrated in phantom in FIG. 1, the pin is removed from the wheel assembly 18 permitting it to freely castor, and the wheel assembly 17 is moved to the angled position illustrated in phantom in FIG. 1, said wheels being parallel with the tractor wheels thus presenting the a narrower width of the swather, under these conditions, for towing purposes.

Present day harvesting equipment and the like is often mounted in tandem in order to obtain a greater effective width thus reducing the time taken for the machine to perform its desired operation and FIGS. 2, 3, 4, 5, 7 and 8 show swather units mounted in tandem or multiple relationship, said relationship being in echelon with one implement being situated behind and to one side of the other implement.

Under these conditions, it is necessary to provide a connector frame assembly collectively designated 22, it being understood that the wheel assemblies 17 and 18 of the swather units 11, 11A, etc., are similar in construction and operation to those hereinbefore described in reference to FIG. 1.

Figure 2:
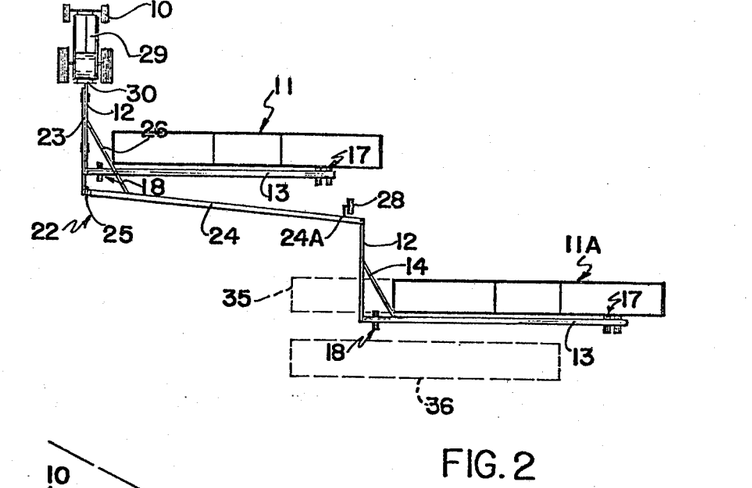
FIG. 2 is a schematic plan view of two implements in echelon with a connector frame extending therebetween and with the implement in the field working position.

Dealing first with the connector frame illustrated in FIG. 2, it consists of a frame hitch pole assembly 23 together with a rear transverse component 24 which, in this embodiment, is pivotally secured to adjacent the rear end of the frame hitch pole assembly by means of pivot pin 25.

Figure 2A:
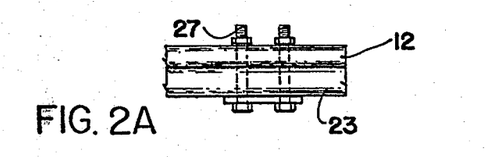
FIG. 2A is a fragmentary enlarged view showing one method of attachment of the hitch poles in the semi-transport position.

A diagonal brace 26 extends between adjacent the front end of the frame hitch pole 23 and the rear transverse component 24 as clearly shown to provide the necessary strength to the frame. The frame hitch pole assembly is detachably secured to the hitch pole 12 of the front swather 11 by means of bolt assemblies 27 as shown in FIG. 2A. Other methods of detachable connection can of course be used.

Means are provided to support the distal ends 24A of the rear transverse components 24 which, in this embodiment, takes the form of a wheel assembly 28 mounted to adjacent the distal end of component 24. This wheel assembly is a castoring wheel assembly, the construction of which is conventional.

Figures 4, 6:
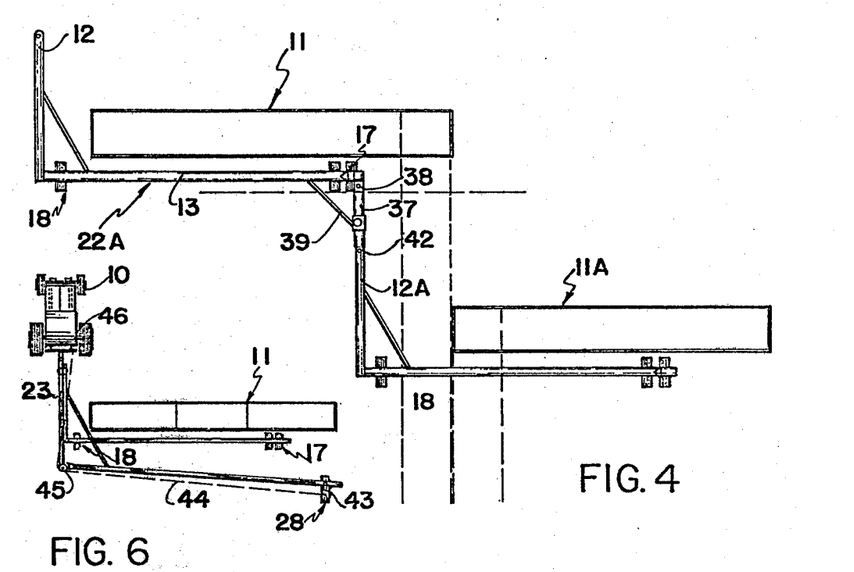
FIG. 4 is a schematic plan view showing an alternative construction to FIG. 3.
FIG. 6 is a schematic plan view similar to FIG. 1 but showing an alternative embodiment.

This castor wheel assembly may or may not be pinned for field position in like manner to wheel assembly 18 of FIG. 1. The castor may also have a lever 43 attached to it so that the castor may be steered relative to the position of the tractor when cornering. This is illustrated in FIG. 6. This prevents rutting of the field by tires during cornering and yet gives lateral stability to unit when in straight ahead field position.

Alternatively, of course, this wheel assembly 28 can be mounted adjacent the front end of the hitch pole 12 of the trailing swather 11A, 11B, etc.

In operation as illustrated in FIG. 2, the swathers operate in the usual manner with the inner end of the swather 11A overlapping slightly the outer end of swather 11 so that all of the crop is engaged by the assemblies. In this instance the tractor 29 is in the straight ahead position as clearly illustrated and connected to the hitch pole 12 by means of the draw bar pin 30 as is usual.

However, when it is desired to transport the multiple assembly, it is not necessary to disconnect same but merely to position the wheel assemblies 18 and 17 to the semi-transport position as described for FIG. 1, it being understood that these wheel assemblies of all of the multiple swather units are adjusted in the same fashion.

Figure 3:
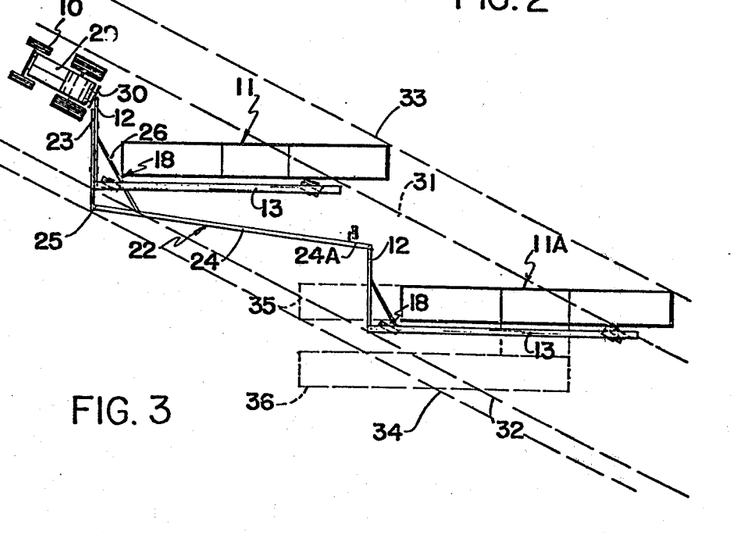
FIG. 3 is a view similar to FIG. 2 but showing the implements in the semi-transport position.

The tractor is then turned at a similar angle so that the entire assembly takes up the position shown in FIG.

3 thus giving, in the present example, a 12 foot tire width on the road as illustrated between dotted lines 31 and 32 and an overall width as indicated by dotted lines 33 and 34.

In FIGS. 2 and 3, the dotted line indicated by reference character 35 illustrates a straight through type double swath unit whereas the dotted lines indicated by reference character 36 indicate a conventional double swath or add on type component.

Given proper positioning of tires 17, 18 and 28 of FIGS. 2 and 3, swath openings of units may be such to allow placement of swaths side by side as shown in FIG. 4; or the rear windrower can deliver its swath on top of the swath left by the front windrower to form one large single swath.

Figure 4A:
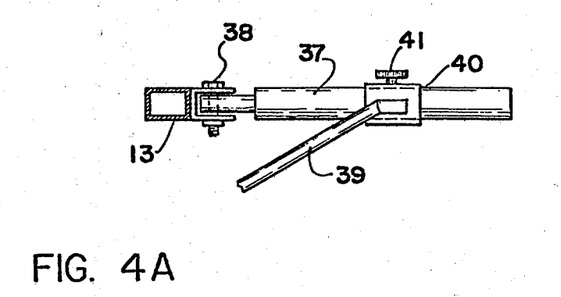
FIG. 4A is a fragmentary enlarged view of the adjustable brace structure of FIG. 4.

With relatively wide swathers now in vogue, it is sometimes desirable to be able to adjust the angular relationship between the rear transverse component 37 of one unit and the hitch pole 12 of the following unit and reference should be made to FIGS. 4 and 4A in this regard. Also in FIG. 4, the hitch pole 12 and the frame 13 of the swather are built with sufficient strength and bracing to pull the second swather although of course a hitch frame similar to 22 can be bolted directly to the hitch pole assembly 12 and to the frame 13 (not illustrated) in a manner similar to that shown in FIG. 2A. In either event, a relatively short hitch member 37 is pivoted to adjacent the outer end of frame 13 by means of pivot pin 38 and the hitch pole assembly 12A of the following swather pivotally connected to the end of this hitch member by means of pivot pin 42.

An adjustable diagonal brace 39 is pivotally connected by one end thereof to the frame member 13 (or to the rear transverse component 29 if used) and a clamp member 40 slidably engages around the hitch 37 and may be clamped in any desired position by means of clamp bolt 41 thus permitting the necessary adjustment between the two units, to be accomplished.

Figure 5:
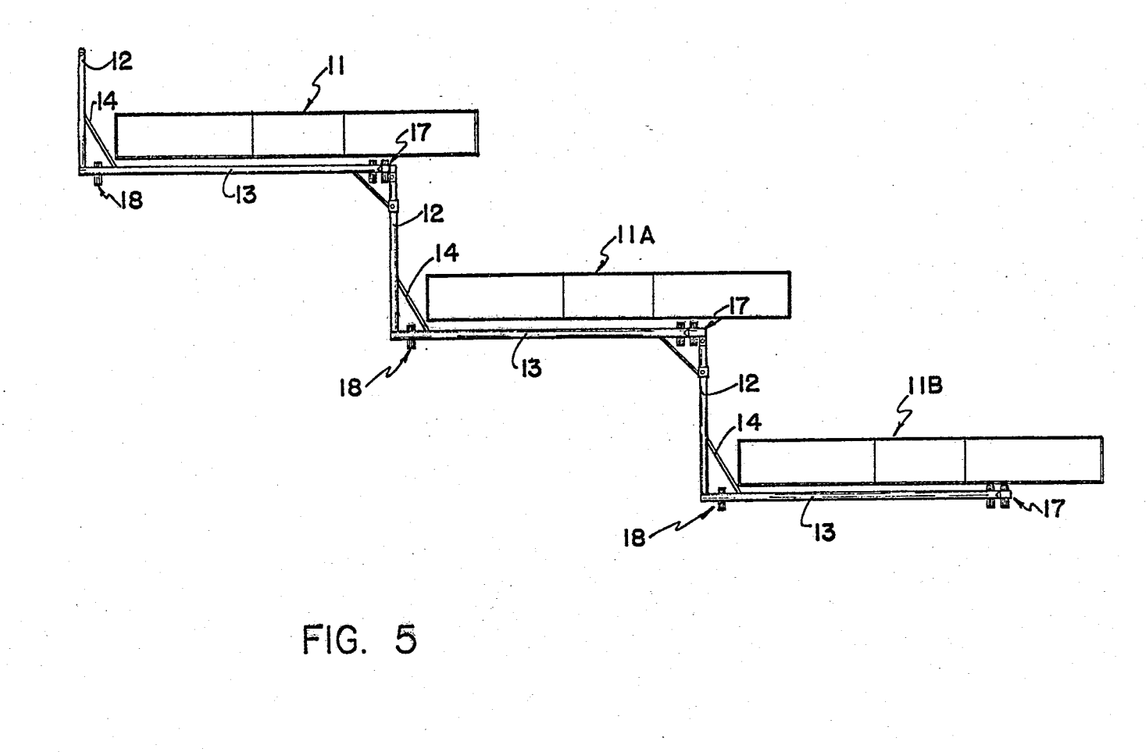
FIG. 5 is a schematic plan view showing three implements connected together in echelon relationship.

FIG. 5 shows a plurality of swathers 11, 11A, 11B, etc., which may be connected together in echelon and changed from field operating position to the transport position and vice versa by a similar means.

Referring back to FIG. 6, lever 43 is shown attached to the spindle of the castor wheel 28. A cable 44 extends from this lever, around a sheave or pulley 45 and to an attaching point 46 at the rear or cornered end of the tractor 10 so that when the tractor is turned, the castor wheel 28 is "steered" when in field position to facilitate turning of the implement and preventing rutting of the field at this point.

Figure 7:
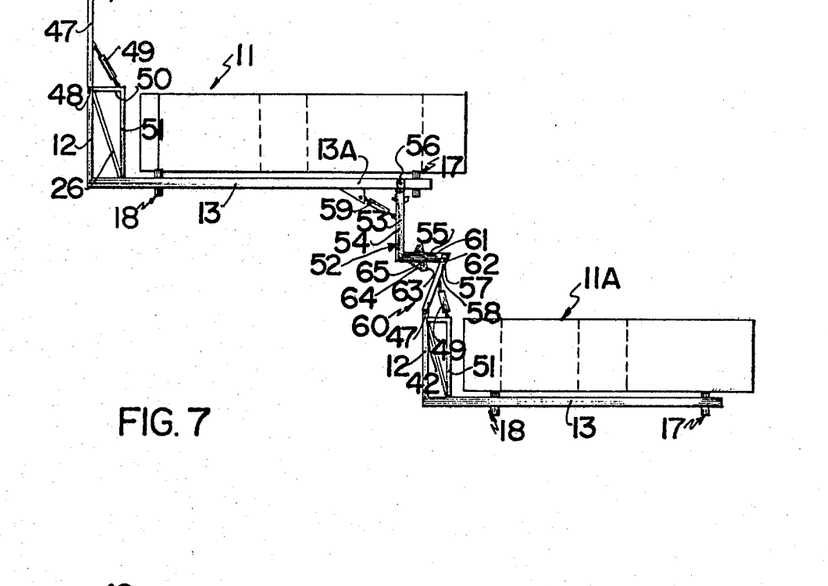
FIG. 7 is a schematic plan view of a further embodiment in the field position which permits transfer to the full transport position, if desired.
Figure 8:
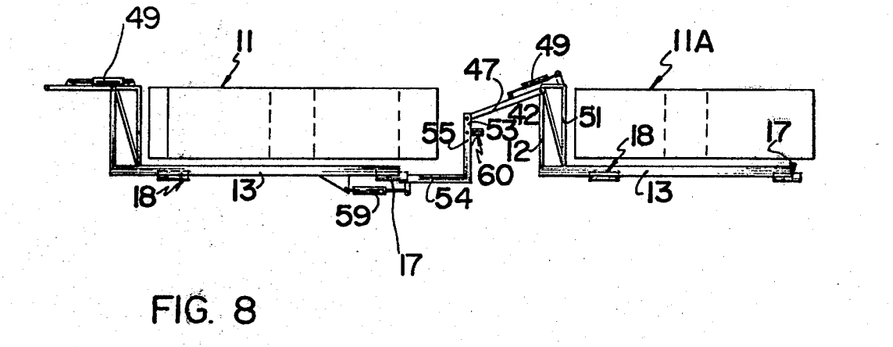
FIG. 8 is a view similar to FIG. 7, but showing the device in the full transport position.

FIGS. 7 and 8 show an embodiment in which the plurality of implements in echelon can be moved to in line astern or what might be termed full transport position as compared with the semi-transport position of FIG. 3.

Where applicable, similar reference characters are used on parts which are common to the previous embodiments.

Although only two such implements 11 and 11A are shown, nevertheless it will be appreciated, in all of the embodiments, that two, three or four implements in echelon can utilize the same construction.

The embodiment shown in FIGS. 7 and 8 utilize general structures similar to that illustrated in FIGS. 4 and 5. However, it will be appreciated that these embodiments are equally applicable to the embodiments illustrated in FIGS. 2 and 3.

Alternatively, the frame structure 22 can be bolted or otherwise secured to the frame 13 similar to that illustrated in FIG. 2A.

The hitch pole assembly 12 of the frame 13 of the implement 11 is provided with a front portion 47 which is hinged as at 48 for movement from a straight ahead position shown in FIG. 7 to a position substantially at right angles thereto, as shown in FIG. 8 and a fluid operator such as an hydraulic piston and cylinder assembly 49, operatively extends between the portion 47 and supporting framework 50, to move this front portion 47 from one position to the other. The supporting framework 50, in this embodiment, includes the main hitch pole 12, a diagonal member similar to member 26 and additional supporting framework 51 clearly illustrated.

Similarly, the hitch pole 12 of the second implement 11A is also provided with a front portion 47, pivoted as at 48 and operated by a fluid operator 49 and also includes the additional supporting or strengthening framework 51.

Figure 9:
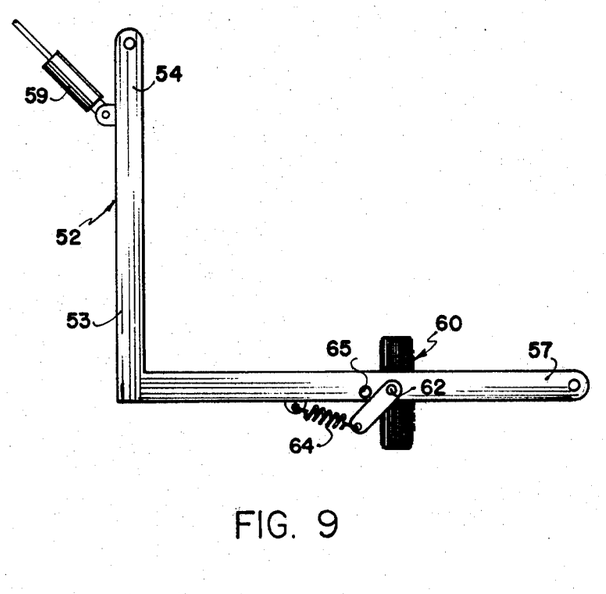
FIG. 9 is a fragmentary enlarged view of the connector of FIG. 7.

Extending between adjacent the outer end 13A of the frame 13, and the front of the front portion 47 of the hitch pole of the implement 11A, is a connector collectively designated 52. This consists of a right angulated or cranked member 53 having a forwardly extending portion 54 and a transverse portion 55 extending at right angles from the rear end of the portion 54. The connector is pivotally connected by the front end of the portion 53 to adjacent the outer end 13A of the frame 13, by means of a universal joint pivot 56 and by the distal end 57 of the portion 55, to the front end of the front portion 47 of the other implements 11A reference character 58 illustrating this pivotal connection.

A further fluid operator in the form of a piston and cylinder assembly 59 extends between the frame 13 and the portion 54 of the connector, and is mounted to the frame 13 in such a fashion that it can move the connector from the position shown in FIG. 7 to the position shown in FIG. 8 and vice versa. All fluid operators are, of course, connected to the hydraulic fluid system of the tractor 10.

It is also desirable, in most operations, to support the connector upon a wheel assembly collectively designated 60. This wheel assembly includes a castor wheel 61 journalled for rotation in a wheel fork (not illustrated) in the usual way and having a substantially vertical mounting spindle 62 extending upwardly through the connector portion 55. A lever or plate 63 is secured to the upper end of the spindle 62 and extends therefrom and a spring 64 extends between the distal end of the lever 63 and the member or portion 55 and normally maintains the wheel 61 in the straight ahead position illustrated in FIG. 7. A stop 65 limits the movement of the lever and hence the wheel in this direction.

In operation, and when it is desired to move the implements from a straight ahead position shown in FIG. 7 to the full transport position shown in FIG. 8, wheel assemblies 17 are unpinned, rotated through approximately 90°, and then re-pinned. Support wheels 18 are also unpinned and are therefore free to castor.

The tractor then slowly drives forwardly as the fluid operators 49 and 59 are actuated. The fluid operator 59 swings the connector around to the position shown in FIG. 8 and the fluid operator 49 moves the front portion 47 of the front and rear hitch poles, to the position shown in FIG. 8 so that the second implement 11A takes up a position substantially in line astern with the first implement as illustrated. The movement of the connector 52, forces the wheel assembly 60 to move so that the wheel 61 is in alignment with the direction of travel of the entire assembly in the full transport position. The pressure of spring 64 against the stop 65 limits the movement of the wheel assembly in this direction.

As mentioned, FIGS. 7 and 8 show the device attached to the frame member 13, but it can be attached to members 24 whether they be as illustrated in FIG. 2 or bolted to the frame 13 as hereinbefore described.

Referring back to diagonal member 26, FIG. 2 the front connections should be such that the brace can move up and down as wheel 28 rides over the terrain. The preferred method (not illustrated) is to connect the brace by means of a pivot pin substantially in alignment with the pin at 25.

It will also be appreciated that telescopic adjustable tubing can be substituted for the fluid operators 49 and 59.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention:

1. In pull type implements such as swathers and the like which include a frame including a transverse rear member, the improvements comprising means for mounting at least two such implements selectively in field working position whereby said implements are in echelon one behind and to one side of the other, and at least one transport position, said means including a rear offside wheel assembly for each implement operatively mounted thereto for selective castoring action from a straight ahead orientation when in field working position, to orientations at an angle to the fore and aft axis of the implement when in the transport position, means to detachably lock said wheel assemblies in any of the said orientations, a hitch pole assembly for each implement extending forwardly from one end of said transverse rear member, said hitch pole assembly of said one implement being connected by the front end thereof to adjacent the outboard end of said transverse rear member of the other of said implements.

2. The invention according to claim 1 which includes a separate frame member extending across the rear of at least one of said implements and being connected by one end thereof to the rear end of said hitch pole assembly.

3. The invention according to claim 1 which includes a near side rear wheel assembly mounted for castoring action and means to fix said near side wheel assembly in a fore and aft relationship when in field working position and to release said near side wheel assembly for free castoring action when in the transport position.

4. The invention according to claim 3 which includes a separate frame member extending across the rear of at least one of said implements and being connected by one end thereof to the rear end of said hitch pole assembly.

5. The invention according to claim 1 which includes means to transfer said implements from the straight ahead field working position to the longitudinally substantially in line astern transport position and vice versa, said means including a front portion of said hitch pole on said other implement being pivotal from a straight ahead position to a position substantially at right angles to the straight ahead position, a front portion of said hitch pole of said one implement pivoting from a straight ahead position to a position substantially at right angles to the straight ahead position, a connector operatively and pivotally connected between the end of said other implement opposite to the hitch pole thereof, and to the front portion of the hitch pole of said one implement, fluid operator means operatively connected between each of said front portions of said hitch poles and the rear portions of said hitch poles to move same from said straight ahead position to said position substantially at right angles to the straight ahead position, and further fluid operator means for moving said connector from a straight ahead position to said transport position.

6. The invention according to claim 5, in which said connector consists of a substantially right angulated member having a first portion pivotally connected to said other implement and a second portion extending at right angles to said first portion, being pivotally connected to said front portion of said hitch pole of said one implement, said further fluid operator means for said connector extending between said other implement and said first portion of said connector, and a wheel support assembly for said connector, said wheel support assembly being pivotally mounted below said connector and including a ground engaging wheel journalled for rotation within said wheel support assembly, a substantially vertical assembly mounting spindle pivotally mounted in said connector, and a lever secured by one end to and extending from said mounting spindle, and spring means extending between the distal end of said lever and said connector normally urging said wheel to the straight ahead position, the transferring of said implement to the transport position forcing said wheel into alignment with the direction of said implements when in said transport position against the action of said spring, said spring returning said wheel to the straight ahead position when said implements are transferred to the field working position and stop means limiting the range of movement of said lever and hence said wheel.

7. The invention according to claim 6 which includes a separate frame member extending across the rear of at least one of said implements and being connected by one end thereof to the rear end of said hitch pole assembly.

8. The invention according to claim 5 which includes a separate frame member extending across the rear of at least one of said implements and being connected by one end thereof to the rear end of said hitch pole assembly.

9. The invention according to claim 3 which includes means to transfer said implements from the straight ahead field working position to the longitudinally substantially in line astern transport position and vice versa, said means including a front portion of said hitch pole on said other implement being pivotal from a straight ahead position to a position substantially at right angles to the straight ahead position, a front portion of said hitch pole of said one implement pivoting from a straight ahead position to a position substantially at right angles to the straight ahead position, a connector operatively and pivotally connected between the end of said other implement opposite to the hitch pole thereof, and to the front portion of the hitch pole of said one implement, fluid operator means operatively connected between each of said front portions of said hitch poles and the rear portions of said hitch poles to move same from said straight ahead position to said position substantially at right angles to the straight ahead position, and further fluid operator means for moving said connector from a straight ahead position to said transport position.

10. The invention according to claim 9 in which said connector consists of a substantially right angulated member having a first portion pivotally connected to said other implement and a second portion extending at right angles to said first portion, being pivotally connected to said front portion of said hitch pole of said one implement, said further fluid operator means for said connector extending between said other implement and said first portion of said connector, and a wheel support assembly for said connector, said wheel support assembly being pivotally mounted below said connector and including a ground engaging wheel journalled for rotation within said wheel support assembly, a substantially vertical assembly mounted spindle pivotally mounted in said connector, and a lever secured by one end to and extending from said mounting spindle, and spring means extending between the distal end of said lever and said connector normally urging said wheel to the straight ahead position, the transferring of said implement to the transport position forcing said wheel into alignment with the direction of said implements when in said transport position against the action of said spring, said spring returning said wheel to the straight ahead position when said implements are transferred to the field working position and stop means limiting the range of movement of said lever and hence said wheel.

11. The invention according to claim 10 which includes a separate frame member extending across the rear of at least one of said implements and being connected by one end thereof to the rear end of said hitch pole assembly.

12. The invention according to claim 9 which includes a separate frame member extruding across the rear of at least one of said implements and being connected by one end thereof to the rear end of said hitch pole assembly.

13. The invention according to claim 1 which includes a rear transverse component extending to one side of the rear end of said hitch pole assembly of said other implement, said rear transverse component extending diagonally behind said other implement and a castor wheel assembly mounted on said rear transverse component towards the distal end thereof.

14. The invention according to claim 13 which includes means to transfer said implements from the straight ahead field working position to the longitudinally substantially in line astern transport position and vice versa, said means including a front portion of said hitch pole on said other implement being pivotal from a straight ahead position to a position substantially at right angles to the straight ahead position, a front portion of said hitch pole of said one implement pivoting from a straight ahead position to a position substantially at right angles to the straight ahead position, a connector operatively and pivotally connected between the end of said other implement opposite to the hitch pole thereof, and to the front portion of the hitch pole of said one implement, fluid operator means operatively connected between each of said front portions of said hitch poles and the rear portions of the hitch pole to move same from said straight ahead position to said position substantially at right angles to the straight ahead position, and further fluid operator means for moving said connector from a straight ahead position to said transport position.

15. The invention according to claim 3 which includes a rear transverse component extending to one side of the rear end of said hitch pole assembly of said other implement, said rear transverse component extending diagonally behind said other implement and a castor wheel assembly mounted on said rear transverse component towards the distal end thereof.

16. The invention according to claim 15 which includes means to transfer said implements from the straight ahead field working position to the longitudinally substantially in line astern transport position and vice versa, said means including a front portion of said hitch pole on said other implement being pivotal from a straight ahead position to a position substantially at right angles to the straight ahead position, a front portion of said hitch pole of said one implement pivoting from a straight ahead position to a position substantially at right angles to the straight ahead position, a connector operatively and pivotally connected between the end of said other implement opposite to the hitch pole thereof, and to the front portion of the hitch pole of said one implement, fluid operator means operatively connected between each of said front portions of said hitch poles and the rear portions of the hitch poles to move same from said straight ahead position to said position substantially at right angles to the straight ahead position, and further fluid operator means for moving said connector from a straight ahead position to said transport position.

17. The invention according to claims 13 or 15 in which said hitch pole component of said one implement is pivotally secured to said rear transverse component of said connector frame assembly and means to adjust, within limits, the angular relationship of said one implement relative to said other implement, said last mentioned means including a selectively clampable, sliding diagonal brace extending between the said rear transverse component and the frame hitch pole connected thereto.

* * * * *